United States Patent [19]
Bigelow

[11] Patent Number: 5,364,037
[45] Date of Patent: Nov. 15, 1994

[54] ELECTRIC CHEESE GRATER WITH SPRING-LOADED CHEESE COMPARTMENT

[75] Inventor: George Bigelow, Chai Wan, Hong Kong

[73] Assignee: Nor-Wol Products, Inc., Canada

[21] Appl. No.: 80,316

[22] Filed: Jun. 22, 1993

[51] Int. Cl.$^5$ ............................................ A01D 55/00
[52] U.S. Cl. .................................. 241/93; 241/169.1; 241/273.3
[58] Field of Search ...................... 241/93, 168, 169.1, 241/199.9, 199.12, 273.1, 273.3, 280, 282 282

[56] References Cited

U.S. PATENT DOCUMENTS

| | | |
|---|---|---|
| D. 252,662 | 8/1979 | Bounds . |
| D. 255,861 | 7/1980 | Hsu . |
| D. 333,762 | 3/1993 | Herren . |
| 3,581,790 | 6/1971 | Del Conte . |
| 3,610,304 | 10/1971 | Popeil . |
| 3,642,045 | 2/1972 | Buvelot . |
| 3,912,176 | 10/1975 | Mantelet . |
| 4,002,298 | 1/1977 | Latora . |
| 4,082,330 | 4/1978 | Bounds . |
| 4,227,656 | 10/1980 | Engebretsen et al. ................ 241/93 |
| 4,906,486 | 3/1990 | Young ............................ 241/169.1 X |
| 5,071,663 | 12/1991 | Dugan . |
| 5,148,995 | 9/1992 | Hurst .............................. 241/169.1 X |

*Primary Examiner*—Timothy V. Eley

[57] ABSTRACT

An electric hand-held cheese grater device has a hinged spring-loaded cheese compartment door. The upper portion houses the power unit, which is activated by a button on the top of the unit. The lower portion houses a vertically-oriented grater blade in the form of a hollow cylinder residing within a conforming exit tube. The grater blade is connected to and rotated by a shaft powered by the power unit. Extending from the side of the lower portion is a cheese compartment wherein a piece of cheese is placed against the grater blade. A hinged, spring-loaded door opens outwardly to allow for the insertion of a piece of cheese into the cheese compartment. The spring-loading action of the door retains the cheese within the cheese compartment and forces the cheese against the rotating grater blade. In this manner, one hand operation of the cheese grater is effected. Furthermore, the unique orientation of the various elements of the invention allows for a compact device which can be easily held in one hand and moved about with ease, so that during operation, the grated cheese emerging from the exit tube can be directed accurately onto a food substrate. Once the cheese has been completely grated, the spring action forces the door into a resting, closed position. In a preferred embodiment, the cheese grater has a unique light source which directs light upon a food substrate.

10 Claims, 4 Drawing Sheets

5,364,037

ELECTRIC CHEESE GRATER WITH SPRING-LOADED CHEESE COMPARTMENT

BACKGROUND OF THE INVENTION

The present invention relates to a battery-operated hand-held cheese grater. More particularly, the invention relates to a hand-held cheese grater with one touch operation which automatically grates a piece of cheese forcibly retained against the grating mechanism by a spring-loaded door, such that grated cheese may be easily and efficiently deposited directly upon a substrate.

Existing cheese grater mechanisms suffer from various drawbacks related to their overly complex design. For example, U.S. Pat. No. 3,610,304 to Popeil discloses a food-cutting machine with semi-automatic feed which comprises a dual-biased spring-loaded hinged pusher mechanism. A piece of food is placed in the hopper. The pusher is then shifted from its open resting position and towards the hopper. In this position, the pusher is forced by the spring to act against the food to retain the food within the hopper and to force it against the rotating disc blade. The blade is powered by a hand-operated crank. The entire unit is secured in a fixed location to a table surface by way of a suction base, and requires that a workbowl be placed near the blade to collect the sliced or grated food. Besides the obvious inconvenience stemming from the need to crank the blade by hand, the Popeil device is deficient in other ways. The fact that the device must be secured to a surface prevents the processed food from being conveniently added directly to a food substrate, for example while cooking or for adding to a prepared plate of food. Furthermore, the dual-biased spring results in the pusher resting in an open position, leaving the hopper open and the cutting blade exposed, with possibly dangerous results.

An existing hand-held cheese grater is described in U.S. Pat. No. 3,581,790 to Del Conte, which teaches a grating device comprising a cylindrical body fitted with a stationary lower grating member and an upper grating member which is rotatable and also capable of sliding vertically within the cylindrical body. The upper grating member is attached to a rotatable shaft and is spring-loaded towards the lower grating member. The cap unscrews and the shaft and upper grating member attached thereto are all removable from the cylinder. A piece of cheese is then placed on the lower grating member and the cap replaced. The cheese is then tightly held between the two grating members. The upper grating member rotates by way of a hand crank or a motor mechanism. As the upper grating member rotates, it grips the cheese and rotates it against the lower grating member. The spring mechanism urges the upper grating member lower to constantly engage the cheese as it becomes smaller due to grating action. Again, the Del Conte device is overly complex and negates the convenience normally obtained by a hand-held device. The entire upper portion, including the cap, shaft and upper grating member must be unscrewed, removed, and then replaced once a piece of cheese has been inserted. This complicated procedure is undesirable for such a simple operation as applying grated cheese to one's food. Furthermore, the requirement for two grating surfaces results in an extra part which will need to be cleaned of debris once use has been completed.

It is therefore an object of the present invention to provide an electric hand-held cheese grater which can be easily operated with the push of a button and from which grated cheese can be directed accurately towards a food substrate.

It is a further object of the present invention to provide a cheese grater in which a piece of cheese can be easily inserted into and retained in a cheese compartment, while being forced automatically and continuously against the grater mechanism.

It is a still further object of the invention to provide a cheese grater of simple construction which is safe to use and which has a minihum of moving parts.

SUMMARY OF THE INVENTION

Accordingly, there is provided an electric hand-held cheese grater device with a hinged spring-loaded cheese compartment door. The upper portion houses the power unit, which is activated by a button on the top of the unit. The lower portion houses a vertically-oriented grater blade in the form of a hollow cylinder residing within a conforming exit tube. The grater blade is connected to and rotated by a shaft powered by the power unit. Extending from the side of the lower portion is a cheese compartment wherein a piece of cheese is placed against the grater blade. A hinged, spring-loaded door opens outwardly to allow for the insertion of a piece of cheese into the cheese compartment. The spring-loading action of the door retains the cheese within the cheese compartment and forces the cheese against the rotating grater blade. In this manner, one hand operation of the cheese grater is effected. Furthermore, the unique orientation of the various elements of the invention allows for a compact device which can be easily held in one hand and moved about with ease, so that during operation, the grated cheese emerging from the exit tube can be directed accurately onto a food substrate. Once the cheese has been completely grated, the spring action forces the door into a resting, closed position.

DETAILED DESCRIPTION OF THE INVENTION

Figure 1:
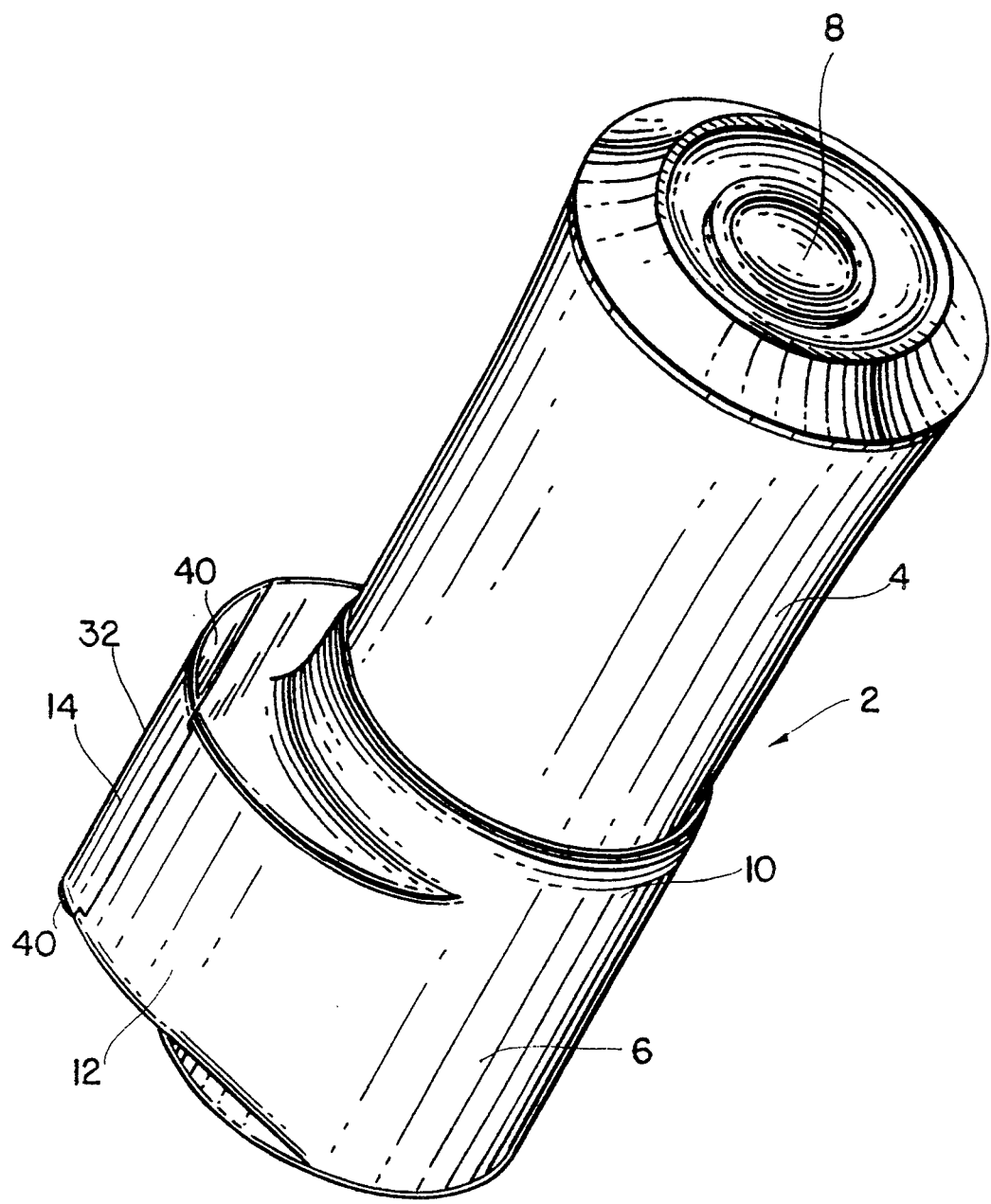
FIG. 1 is a perspective view of the cheese grater of the present invention in a closed door position.

With reference to FIGS. 1–4, the cheese grater 2 of the invention generally comprises an upper portion 4 and a lower portion 6. The upper portion 4 houses therein a power unit, which may be a battery-operated electric motor. The upper portion 4 preferably is shaped as a cylinder which can easily be gripped by the hand of the operator. The upper portion 4 also has an actuator button 8 connected to the power unit for setting the power unit into operation. The button 8 should be located such that it can easily be reached by the operator with the same hand that simultaneously grips the upper portion.

The lower portion 6 comprises the grater housing 10 and a portion which extends outwardly from the grater housing 10 on one side thereof to act as a cheese compartment 12. The cheese compartment 12 has a hinged door 14, the outside of which is preferably flush with the outside of the cheese compartment 12 when the door is in the closed (resting) position.

Figure 2:
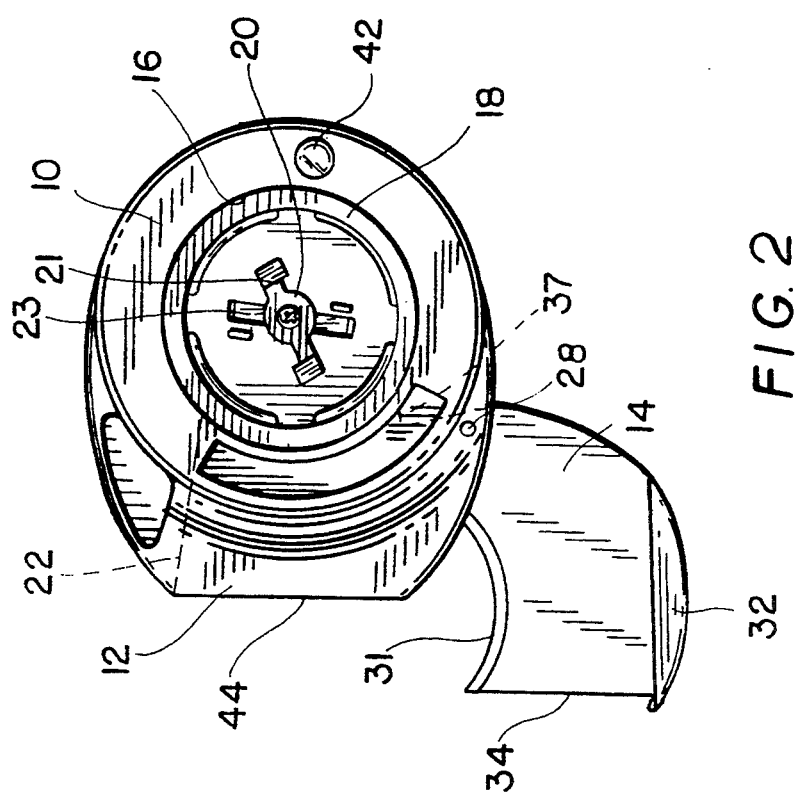
FIG. 2 is a bottom view of the cheese grater in an open door position.
Figure 3:
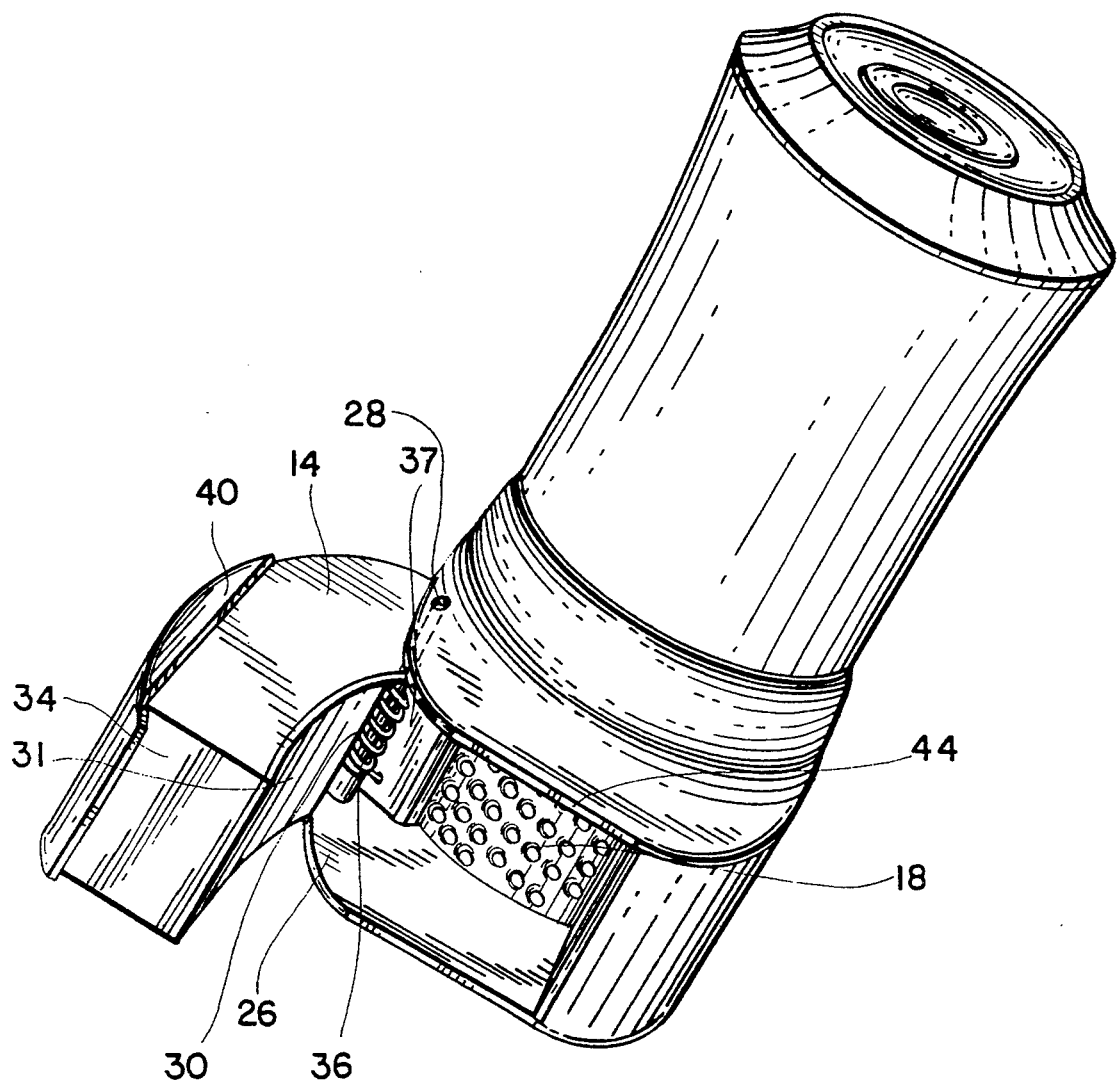
FIG. 3 is a perspective view of the cheese grater in an open door position.
Figure 4:
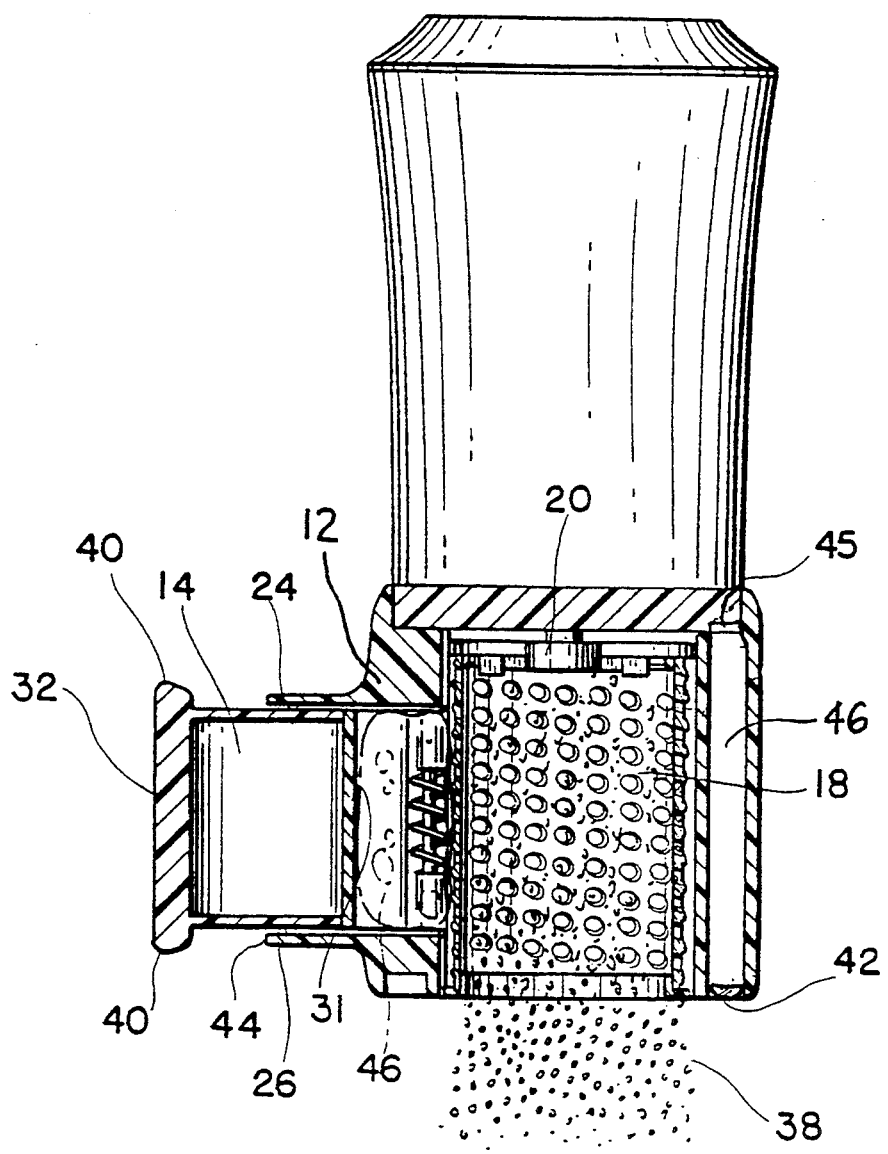
FIG. 4 is a side elevation view of the cheese grater showing the lower portion thereof in cross-section, with the door in a partially open position.

As can be seen from FIG. 4, the grater housing 10 has a hollow cylindrical space defined by the grater housing inner wall 16, which inner wall 16 has an opening to the cheese compartment, which will be described below. A hollow cylindrical grater blade 18 is situated conformingly within the grater housing 10 for rotation therein. The grater blade is oriented coaxially with the upper portion 4 of the grater 2. The grater blade 18 is connected to a vertical rotating shaft 20, which shaft 20 extends from and is rotated by the power unit. The shaft extends into the lower portion 6 to removably engage the grater blade, and acts to rotate the blade during operation of the device. Preferably, the shaft 20 may have on its end a perpendicular locking piece 21. The grater blade 18 may have a conforming slot 23 which receives the locking piece 21. The blade 18 is retained on the shaft 20 by rotating the blade 18 relative to the shaft 20 until a locking position is reached, as shown in FIG. 2.

The cheese compartment 12 comprises a side wall 22, and an upper shelf 24 and lower shelf 26, all of which are intergral with and extend from the grater housing 10 in generally perpendicular orientation with respect to the cheese grater. A door 14 is hinged at a pivot point 28 on the side of the compartment opposite the side wall 22. The door 14 is biased by a spring 30 in the closing direction, i.e. towards the grater blade 18. The lower shelf 26 acts to support a piece of cheese 46 placed within the compartment 12 before being acted upon by the door 14, as will be explained below.

The cheese compartment door 14 acts as both a protective door and as a pusher mechanism. Since the door 14 is biased towards the grater blade, the door remains in the closed position unless acted upon by the operator, thereby preventing accidental insertion of unwanted objects into the cheese compartment. In addition, the door 14 is designed to act as a pusher mechanism which simultaneously retains a piece of cheese 46 within the cheese compartment and pushes the cheese against the rotating grater blade during grating operation.

The door 14 is shaped to conformingly reside within the cheese compartment 12 on all sides such that the door operates to plug the cheese compartment during operation to prevent grated cheese from emerging from the compartment. The door inside face 31 is a concave cylindrical arc having a similar radius as the cylindrical grater blade, such that a piece of cheese placed between the inside face 31 and the grater blade 18 is grated to completion. As the piece of cheese diminishes in size during grating operation, the door 14 continues to push the remaining piece of cheese against the rotating grater blade. As the cheese gets smaller and smaller, the door inside face 31 and the grater blade 18 approach a nesting orientation which insures that the cheese will be completely grated. The door outside face 32 should preferably take on a shape such that in a closed door position, the door appears to be flush or integral with the lower portion 6. This insures that when the device is not in use, or when cheese grating operation is complete, there are no protruding elements which could be dangerous.

The door 14 also has a lateral wall 34 opposite the pivoting end of the door, which wall 34 conforms to and abuts the side wall 22 of the cheese compartment. The abutment of the side wall 34 against the side wall 22 should occur immediately before the inside face 31 reaches the grater blade 18, such that the inside face 30 and blade 18 come as close to each other as possible. Thus, the side wall and lateral wall may together comprise a stop means for effecting nearly complete grating of a piece of cheese while preventing damaging contact between the inside face 31 and the blade 18. Alternately, the stop means may comprise the tabs 40 abutting the outside edge 44 of the cheese compartment. On the side near the pivot point, the door 14 has a recess 36 for accommodating the edge of the grater housing wall 37. The door 14 should have a gripping means which permits the operator to grip the door. Preferably, this element may be in the form of upper and lower tabs 40 which extend vertically from the door outside face and rest against the outside edge 44 of the cheese compartment. Alternately, the gripping means may be inwardly extending protrusions within the door outside face.

In a preferred embodiment, cheese grater 2 has a light source 42 located on the bottom of the lower portion 6, which light is electrically connected to and actuated by power unit via the button, simultaneously with rotation of the shaft. The light 42 should be directed downwardly toward the intended substrate, such that it generally coincides with the path of the falling grated cheese. This embodiment is especially advantageous in darkly lit restaurants, whereby the operator can insure the precise application of grated cheese by simply directing the emerging light toward the desired location.

The lamp unit may be located directly at the light source 42, with an electrical connection being made through the lower portion to the power unit. Preferably, however, the lamp 45 is located within the upper portion at the bottom face thereof. This allows for direct and permanent electrical connection between the lamp 45 and the power unit. In this embodiment, the lamp 45 on the upper portion is aligned with a light conducting vertical shaft 46 running the length of the lower portion. The shaft 46 continues to the bottom of the lower portion at the light source 42. The shaft may be hollow or filled with a transparent solid core. Additionally, the light source 42 may be provided with a lens which alters the shape and/or direction of the emerging light.

The cheese grater of the invention operates easily and conveniently to direct freshly grated cheese onto food or other substrate. Parmesan, Romano or other hard cheese is particularly suited for use with the invention, as is chocolate or other gratable foods. The operator pulls the door 14 open and places a piece of cheese within the cheese compartment 12 upon the lower shelf 26. When the door is released, the door springs toward the grater blade, retaining the cheese within the compartment and forcing it against the blade. The operator then grips the cheese grater around the upper portion, locates the cheese grater above the substrate, and pushes the actuator button. As the blade rotates, grated cheese emerges from the hollow center of the grater housing and falls from the lower portion of the cheese grater. Since the device is easily held in one hand during operation, the emerging grated cheese 38 may be moved during operation to cover different areas of the substrate.

What is claimed is:

1. An electric hand-held cheese grater, comprising an upper portion housing a power unit, an actuator for engaging the power unit, and a lower portion, the lower portion comprising

- a grater housing having a hollow vertical cylindrical opening, said grater housing being open at a bottom end thereof for permitting the emergence of freshly grated cheese, said cylindrical opening accommodating conformingly therein a hollow cylindrical grater blade, the grater blade being attached at its upper end to a vertical rotatable shaft extending from the power unit, which rotatable shaft rotates upon actuation of the power unit to thereby rotate the grater blade,
- a cheese compartment extending laterally from the grater housing at an open side thereof, the cheese compartment comprising a lower shelf and a side wall, the cheese compartment having a hinged door attached to the cheese compartment at a pivot point, the pivot point being located on a side of the cheese compartment opposite the cheese compartment side wall, the pivot point comprising a unidirectional spring means which biases the door in a closing direction to automatically retain a piece of cheese placed within the cheese compartment and continually force the cheese against the grater blade, the door having an inside face in the shape of a concave cylindrical arc with a radius substantially equal to that of the cylindrical grater blade, the door further having a lateral face which conforms to and abuts the cheese compartment side wall when the door is in the closed position, the door being shaped as a conforming plug which resides within the cheese compartment in a door closed position, and a door stop means which prevents grating contact between the grater blade and the inside face of the door.

2. The cheese grater of claim 1, wherein an outer face of the door is shaped to substantially conform to an outer profile of the lower portion.

3. The cheese grater of claim 1, wherein the outer face of the door has gripping means to allow for the opening of the door against the bias thereof.

4. The cheese grater of claim 3, wherein said gripping means are a vertical tabs extending from an upper and lower edge of the outer face of the door, which tabs remain outside of the cheese compartment in the door closed position.

5. The cheese grater of claim 4, wherein the vertical tabs abut an outside edge of the cheese compartment in the door closed position to thereby comprise the stop means.

6. The cheese grater of claim 1, wherein the stop means comprises the door lateral face and the cheese compartment side wall.

7. The cheese grater of claim 1, further comprising a light source which provides light upon a substrate upon which grated cheese will fall upon emergence from the bottom of the cheese grater during operation thereof.

8. The cheese grater of claim 7, wherein the light source is electrically connected to the power unit.

9. The cheese grater of claim 8, wherein the light source is actuated by the actuator, such that the light source and the rotatable shaft both operate simultaneously.

10. The cheese grater of claim 8, wherein the light source comprises a lamp located at the bottom of the upper portion, the lamp being aligned with a light conducting vertical shaft running the length of the lower portion and emerging at a light source at a bottom end thereof such that light is emitted from the light source.

* * * * *